(12) United States Patent
Park et al.

(10) Patent No.: US 8,928,777 B2
(45) Date of Patent: Jan. 6, 2015

(54) APPARATUS AND METHOD FOR GENERATING MOTION BLUR IN MOBILE TERMINAL

(71) Applicant: Samsung Electronics Co. Ltd., Suwon-si (KR)

(72) Inventors: Min-Kyu Park, Seoul (KR); Yong-Gu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 13/664,655

(22) Filed: Oct. 31, 2012

(65) Prior Publication Data

US 2013/0113950 A1    May 9, 2013

(30) Foreign Application Priority Data

Nov. 8, 2011    (KR) ........................ 10-2011-0116048

(51) Int. Cl.
| H04N 5/262 | (2006.01) |
| H04N 5/228 | (2006.01) |
| H04N 5/222 | (2006.01) |
| G06T 5/50 | (2006.01) |
| H04N 5/14 | (2006.01) |

(52) U.S. Cl.
CPC ......... G06T 5/50 (2013.01); *G06T 2207/10016* (2013.01); *G06T 2207/20201* (2013.01); *H04N 5/145* (2013.01)
USPC ..................... 348/239; 348/208.1; 348/222.1; 348/333.01; 348/333.11

(58) Field of Classification Search
USPC .......... 348/33.01–333.13; 382/107, 162–167, 382/260, 265
See application file for complete search history.

(56) References Cited

U.S. PATENT DOCUMENTS

| 5,557,684 | A  | * | 9/1996 | Wang et al. .................... 382/107 |
| 7,643,070 | B2 | * | 1/2010 | Ono ............................... 348/239 |
| 8,749,560 | B2 | * | 6/2014 | Ording ........................... 345/475 |
| 2002/0140823 | A1 | * | 10/2002 | Sakurai et al. ........... 348/207.99 |
| 2005/0134591 | A1 | * | 6/2005 | Baxter ......................... 345/473 |
| 2005/0138569 | A1 | * | 6/2005 | Baxter et al. ................. 715/788 |
| 2006/0177145 | A1 | * | 8/2006 | Lee et al. ..................... 382/255 |
| 2006/0203109 | A1 | * | 9/2006 | Ono ............................... 348/239 |
| 2008/0106615 | A1 | * | 5/2008 | Ahonen et al. ........... 348/231.99 |
| 2009/0096897 | A1 | * | 4/2009 | Saito ............................. 348/241 |
| 2009/0225183 | A1 | * | 9/2009 | Tamura ...................... 348/222.1 |
| 2010/0026827 | A1 | * | 2/2010 | Kobayashi et al. ........ 348/222.1 |
| 2010/0026880 | A1 | * | 2/2010 | Ito et al. ....................... 348/352 |
| 2010/0225772 | A1 | * | 9/2010 | Murayama et al. ........ 348/208.4 |
| 2010/0265353 | A1 | * | 10/2010 | Koyama et al. ............ 348/222.1 |
| 2010/0277644 | A1 | * | 11/2010 | Blume .......................... 348/452 |
| 2011/0274407 | A1 | * | 11/2011 | Kogusuri ..................... 386/230 |
| 2012/0033137 | A1 | * | 2/2012 | Fujiyama et al. ............ 348/607 |
| 2012/0038793 | A1 | * | 2/2012 | Shimizu et al. .......... 348/231.99 |
| 2012/0069204 | A1 | * | 3/2012 | Shimizu et al. ............ 348/208.4 |
| 2013/0057714 | A1 | * | 3/2013 | Ishii et al. .................. 348/208.4 |
| 2013/0063616 | A1 | * | 3/2013 | Ishii et al. .................. 348/208.6 |
| 2014/0079333 | A1 | * | 3/2014 | Hirai et al. .................... 382/255 |
| 2014/0104458 | A1 | * | 4/2014 | Tanaka .......................... 348/239 |

* cited by examiner

*Primary Examiner* — Michael Osinski
(74) *Attorney, Agent, or Firm* — Jefferson IP Law, LLP

(57) ABSTRACT

An apparatus and a method for generating a motion blur in a mobile terminal are provided. It is determined whether motion halting occurs during video shooting. If the motion halting occurs, a motion vector of each block between first and second consecutive images where the motion halting has occurred is estimated. A motion blur is generated on the second image using the motion vector of each block, and the motion-blurred image is displayed on a display unit.

13 Claims, 5 Drawing Sheets

APPARATUS AND METHOD FOR GENERATING MOTION BLUR IN MOBILE TERMINAL

PRIORITY

This application claims the benefit under 35 U.S.C. §119(a) of a Korean Patent Application filed in the Korean Intellectual Property Office on Nov. 8, 2011 and assigned Serial No. 10-2011-0116048, the entire disclosure of which is hereby incorporated by reference.

BACKGROUND OF THE INVENTION

1. Field of the Invention

The present invention relates to a mobile terminal. More particularly, the present invention relates to an apparatus and method for generating motion blur on video images in a mobile terminal.

2. Description of the Related Art

Due to the rapid development of mobile terminal technology, mobile terminals provide not only call features but also various other features, including a camera feature. Because of limitations on thickness and size, the mobile terminal may be configured to control the camera feature by adjusting an integration time (or exposure time) of an image sensor instead of the shutter speed thereof.

In dark shooting environments, the mobile terminal may increase an analog gain and a digital gain, or decrease the shutter speed (or increase the integration time). In bright shooting environments, the mobile terminal may decrease the analog gain and the digital gain, or increase the shutter speed (or decrease the integration time).

In bright shooting environments, due to the short integration time, motion halting may occur in which a motion being displayed may undergo intermittent halting if a frame rate is not high enough during video shooting. The motion halting prevents the video from being played smoothly.

Accordingly, there is a need for an apparatus and method capable of preventing a mobile terminal from undergoing motion halting during its video shooting in the bright shooting environments.

SUMMARY OF THE INVENTION

Aspects of the present invention are to address the above-mentioned problems and/or disadvantages and to provide at least the advantages described below. Accordingly, an aspect of the present invention is to provide an apparatus and method for generating motion blur on images to prevent motion halting.

In accordance with an aspect of the present invention, an apparatus for generating a motion blur in a mobile terminal is provided. The apparatus includes a motion blur generator for, when motion halting occurs during video shooting, estimating a motion vector of each block between first and second consecutive images where the motion halting has occurred, for generating a motion blur on the second image based on the motion vector of each block, and for displaying the motion-blurred image on a display unit.

In accordance with another aspect of the present invention, a method for generating an image blur in a mobile terminal is provided. The method includes determining whether motion halting occurs during video shooting, when the motion halting occurs, estimating a motion vector of each block between first and second consecutive images where the motion halting has occurred, generating a motion blur on the second image based on the motion vector of each block, and displaying the motion-blurred image on a display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile terminal, to which an exemplary embodiment of the present invention is applicable, includes a mobile electronic device adapted for portability, such as a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-book, a portable computer (e.g., notebook computer, table PC, etc.), and a digital camera.

Figure 1:
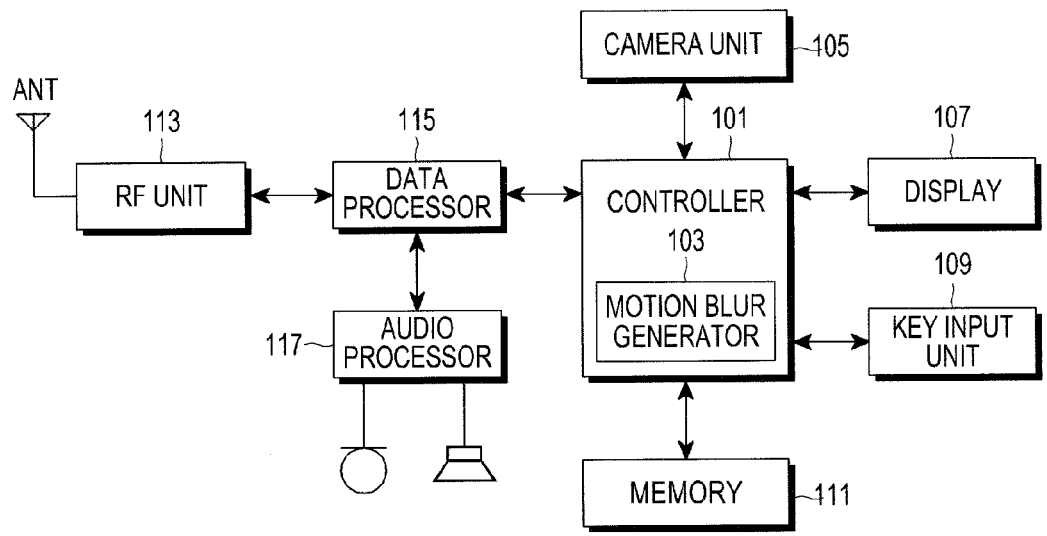
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the mobile terminal includes a controller 101, a camera unit 105, a display 107, a key input unit 109, a memory 111, a Radio Frequency (RF) unit 113, a data processor 115, and an audio processor 117.

The RF unit 113 is responsible for wireless communication of the mobile terminal. The RF unit 113 includes a wireless transmitter for up-converting a frequency of a transmission signal and amplifying the up-converted signal, and a wireless receiver for low-noise-amplifying a received signal and down-converting a frequency of the low-noise-amplified signal. The data processor 115 includes a transmitter for encoding and modulating a transmission signal, and a receiver for demodulating and decoding a received signal. The data processor 115 may include a modulator/demodulator (modem) and a coder/decoder (codec). The codec may include a data codec for processing packet data and an audio codec for processing an audio signal such as voice.

The audio processor 117 is responsible for playing a received audio signal output from the data processor 115 through a speaker (SPK) and transferring a transmission audio signal picked up by a microphone (MIC) to the data processor 115. The key input unit 109 may include alphanumeric keys for inputting alphanumeric information and function keys for setting various functions. The display 107 displays image signals on its screen, and displays output data requested by the controller 101. If the display 107 is a capacitive or resistive touch screen, the key input unit 109 may have a predetermined minimum number of keys, and the display 107 may replace some of the key input function of the key input unit 109.

The memory 111 includes a program memory and a data memory. The program memory stores booting information and an Operating System (OS) for controlling the general operation of the mobile terminal, while the data memory stores various data generated during operation of the mobile terminal.

The camera unit 105 generates an image by taking a picture of a subject and outputs the generated image to the controller 101. The camera unit 105 may not only take a still image but also shoot video.

Figure 2:
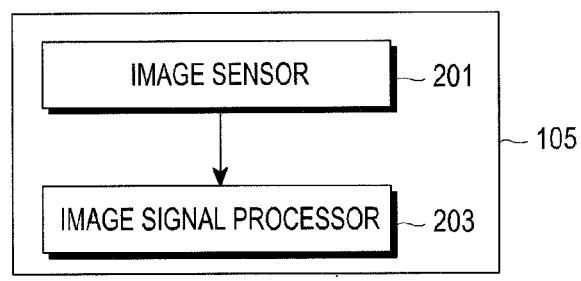
FIG. 2 is a block diagram of a camera unit according to an exemplary embodiment of the present invention.

FIG. 2 is a block diagram of a camera unit according to an exemplary embodiment of the present invention.

Referring to FIG. 2, the camera unit 105 includes an image sensor 201 and an image signal processor 203.

The image sensor 201 takes a picture of a subject through a lens and outputs a frame-based image of the subject to the image signal processor 203. The image sensor 201 generates an image in the Bayer pattern as shown in FIG. 4, and outputs the generated image to the image signal processor 203.

Figure 4:
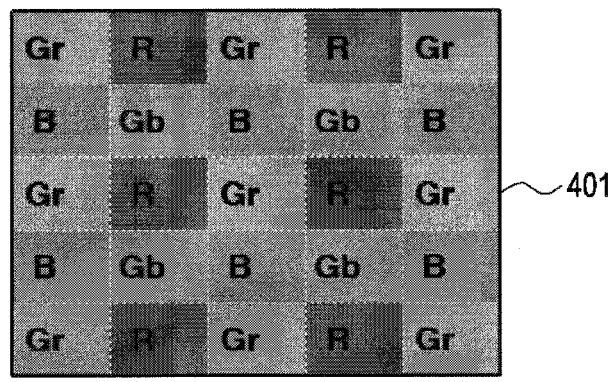
FIG. 4 illustrates an image output from an image sensor according to an exemplary embodiment of the present invention.

FIG. 4 illustrates an image output from an image sensor according to an exemplary embodiment of the present invention.

Referring to FIG. 4, an image 401 is an example of the image output from the image sensor 201. In the image 401, B represents blue, R represents red, Gb represents green between blue and blue, and Gr represents green between green and green.

The image sensor 201 may be a Complementary Metal Oxide Semiconductor (COMS) sensor, a Charge Coupled Device (CCD) sensor, a Foveon sensor, a complementary image sensor, etc.

To improve the quality of the image received from the image sensor 201, the image signal processor 203 performs lens correction, color interpolation, gamma correction, color matrix, noise reduction, and chroma suppression.

The lens correction refers to correcting brightness values of pixels in the vicinity of the lens, and the color interpolation refers to converting the Bayer patterned image received from the image sensor 201 into an RGB or YUV image. The YUV scheme represents a color with three different types of information: a luminance signal (Y), a difference (U) between the luminance signal and a red component, and a difference (V) between the luminance signal and a blue component. The RGB scheme represents a color with red, green and blue.

The gamma correction refers to matching the actual digital image with a signal value of an image output device at a ratio of one to one (1:1) when outputting a digitalized image on a display. The color matrix refers to matching digital values of the image sensor 201 with human eyes at a ratio of one to one (1:1). The noise reduction refers to removing noises from the image, and chroma suppression refers to removing color noises.

The image signal processor 203 converts the input Bayer-patterned image into a YUV or RGB image, and outputs the converted image to the controller 101. For example, the image signal processor 203 may output an image In(x,y) and an image In +1(x,y) to the controller 101, where In represents an n-th image, In +1 represents an (n+1)-th image, x represents the horizontal coordinate in the image, and y represents the vertical coordinate in the image.

The controller 101 controls the overall operation of the mobile terminal. The controller 101 includes a motion blur generator 103 that generates motion blur on an image if a frame rate is less than a predetermined reference value during video shooting. The term 'motion blur' denotes distinct stripes of a fast moving object projected in consecutive pictures or a still image such as an image and an animation. The reference value is determined taking into account the frame rate at which a motion of the subject may not be stopped when the user watches video. For example, the reference value may be set to 60 or 50 frames per second.

Figure 3:
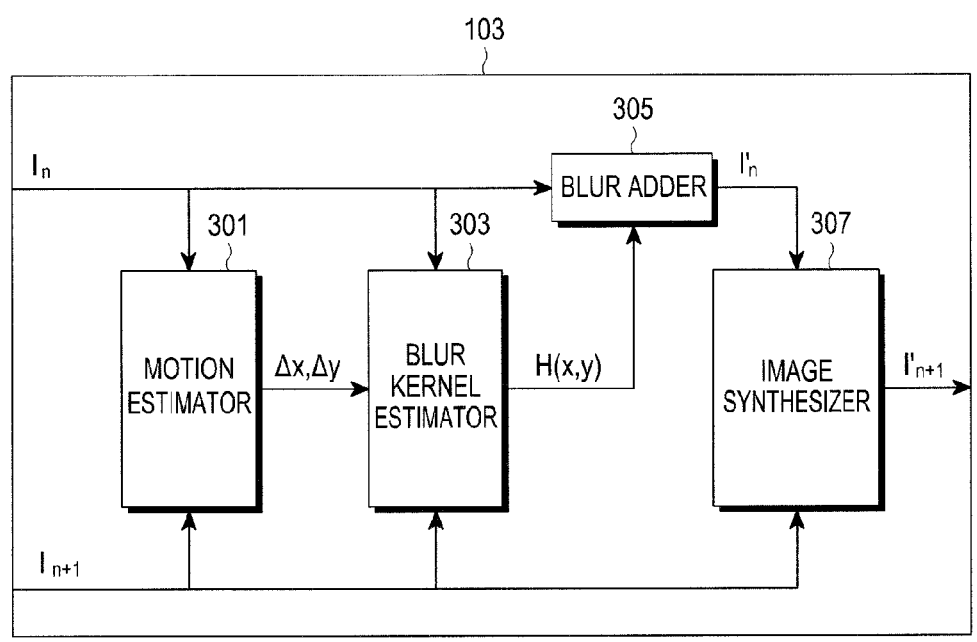
FIG. 3 is a block diagram of a motion blur generator according to an exemplary embodiment of the present invention.

FIG. 3 is a block diagram of a motion blur generator according to an exemplary embodiment of the present invention.

Referring to FIG. 3, the motion blur generator 103 includes a motion estimator 301, a blur kernel estimator 303, a blur adder 305, and an image synthesizer 307.

When motion halting occurs during video shooting, the motion estimator 301 receives two consecutive images In(x, y) and In +1(x,y) where motion halting has occurred, from the image signal processor 203, and estimates a motion between the two received images. The motion estimator 301 detects occurrence of the motion halting if the frame rate of the video is less than a predetermined reference value.

When motion halting occurs, the motion estimator 301 divides an input image into a plurality of blocks having the same size, and calculates a motion vector of each block. The motion estimator 301 may calculate a motion vector of each block using Equation (1) below.

$$\underset{\Delta x_i \Delta y_j}{\mathrm{argmin}} \sum_{i \in Bx_i} \sum_{y \in By_j} |I_n(x, y) - I_{n+1}(x + \Delta x_i, y + \Delta y_j)| \quad (1)$$

In equation 1, Bxi represents an x-axis range of the block, Byj represents a y-axis range of the block, In represents an n-th image, In +1 represents an (n+1)-th image, x represents the horizontal coordinate in the image, and y represents the vertical coordinate in the image.

The motion estimator 301 estimates $\Delta x_i$ and $\Delta y_j$ so as to minimize a value of Equation (1) for any one block among the plurality of blocks, and determines the estimated $\Delta x_i$ and $\Delta y_j$ as a motion vector, thereby calculating a motion vector corresponding to the block. By repeating this process, the motion estimator 301 calculates a motion vector of each block, and outputs the calculated motion vector of each block to the blur kernel estimator 303. For example, if an image is divided into 9 blocks, the motion estimator 301 may calculate 9 motion vectors corresponding to the 9 blocks.

Figure 5:
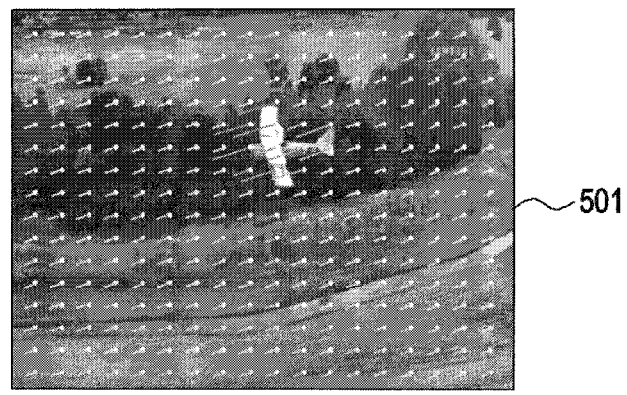
FIG. 5 illustrates a motion vector shown on an image according to an exemplary embodiment of the present invention.

FIG. 5 illustrates a motion vector shown on an image according to an exemplary embodiment of the present invention.

Referring to FIG. 5, an image 501 shows a motion vector of each block using arrows. In the image 501, motion vectors corresponding to 288 divided blocks are shown.

For a better understanding of exemplary embodiments of the present invention, it is assumed herein that an image is divided into a plurality of blocks and a motion vector is calculated for each block. However, exemplary embodiments of the present invention are not limited thereto. For example, the motion estimator 301 may calculate a motion vector for the entire image or calculate motion vectors corresponding to all pixels without dividing the image.

The blur kernel estimator 303 estimates a kernel of a motion blur for each block based on the input motion vector of each block, and outputs the estimated kernel of a motion blur for each block to the blur adder 305. The blur kernel estimator 303 estimates a kernel of motion blurs according to the magnitudes of motion vectors.

For example, if 9 motion vectors are received from the motion estimator 301, the blur kernel estimator 303 may calculate a kernel of 9 motion blurs corresponding to the 9 motion vectors.

In another example, for a motion vector of (5, 0), because there is a motion only in the x-axis direction (i.e., horizontal direction), the blur kernel estimator 303 may estimate a kernel of motion blur using a horizontal uniform blur matrix. If the center value is assumed to be arbitrary coordinates (x,y), a motion blur kernel H(x,y) of the motion vector (5, 0) is $$H(x, y) = \begin{bmatrix} 0 & 0 & 0 & 0 & 0 \\ 0 & 0 & 0 & 0 & 0 \\ \frac{1}{5} & \frac{1}{5} & \frac{1}{5} & \frac{1}{5} & \frac{1}{5} \\ 0 & 0 & 0 & 0 & 0 \\ 0 & 0 & 0 & 0 & 0 \end{bmatrix}$$

The blur adder 305 adds the motion blur to the image In(x,y) using the motion blur kernel for each block, received from the blur kernel estimator 303, and outputs the motion blur-added image I'n(x,y) to the image synthesizer 307.

The blur adder 305 performs convolution on any one of a motion blur kernel of each block and each pixel included in the block. The blur adder 305 adds motion blur to the image In(x,y) by performing this operation for each block.

The blur adder 305 may generate an image I'n(x,y) using Equation (2) below.

$$I'_n(x,y) = I_n(x,y) ** H(x,y) \quad (2)$$

In Equation 2, I'n represents an n-th image to which image blur is added, In represents an n-th image, H represents a motion blur kernel, x represents the horizontal coordinate in the image, and y represents the vertical coordinate in the image.

The image synthesizer 307 generates a motion blur-synthesized image I'$_{n+1}$(x,y) by synthesizing the motion blur-added image I'$_n$(x,y) and an (n+1)-th image I$_{n+1}$(x,y) using a predefined weight w(x,y). After outputting the image I$_n$(x,y) on the display 107, the image synthesizer 307 outputs the image I'$_{n+1}$(x,y) instead of the image I$_{n+1}$(x,y), thereby preventing the motion halting.

The image synthesizer 307 may generate the image I'$_{n+1}$(x,y) using Equation (3) below.

$$I'_{n+1}(x,y) = I'_n(x,y) \times w(x,y) + I_{n+1}(x,y) \times (1 - w(x,y)) \quad (3)$$

In Equation 3, I'$_{n+1}$ represents a motion blur-synthesized image, I'$_n$ represents an n-th image to which image blur is added, and I$_{n+1}$(x,y) represents an (n+1)-th image. w(x,y) is a weight representing a synthetic ratio of I'$_n$(x,y) to I$_{n+1}$(x,y), having a range of 0≤w(x,y)≤1. x represents the horizontal coordinate in the image, and y represents the vertical coordinate in the image.

The weight may be set within the range according to the previously calculated frame rate. For example, if the weight w(x,y) is 0.5, the image synthesizer 307 may synthesize the image I'$_n$(x,y) and the image I$_{n+1}$(x,y) at a ratio of one to one (1:1). Similarly, if the weight w(x,y) is 0.6, the image synthesizer 307 may synthesize the image I'$_n$(x,y) and the image I$_{n+1}$(x,y) at a ratio of six to four (6:4).

Figure 6:
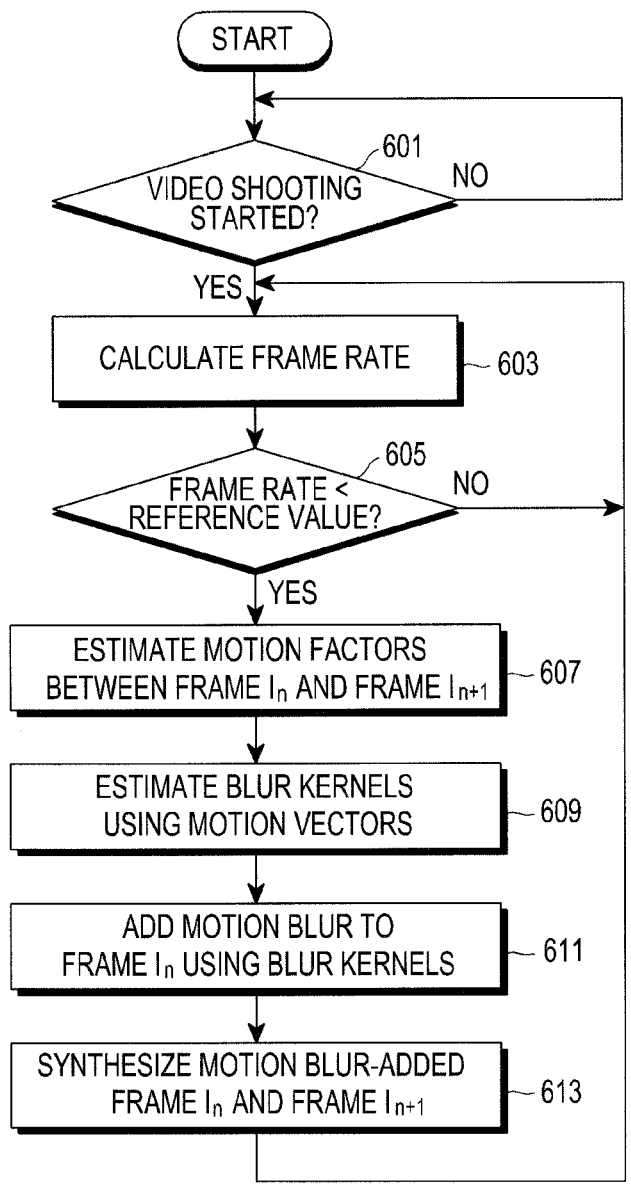
FIG. 6 is a flowchart for generating motion blur on an image by a mobile terminal according to an exemplary embodiment of the present invention.

FIG. 6 is a flowchart for generating motion blur on an image by a mobile terminal according to an exemplary embodiment of the present invention.

Referring to FIG. 6, the mobile terminal determines in step 601 whether video shooting is requested. If video shooting is requested, the mobile terminal proceeds to step 603. Otherwise, the mobile terminal repeats step 601.

In step 603, the mobile terminal calculates a frame rate of video. In step 605, the mobile terminal compares the calculated frame rate with a predetermined reference value. The reference value is determined taking into account the frame rate at which a motion of the subject may not be stopped when the user watches video. For example, the reference value may be set to 60 frames per second.

If the calculated frame rate is less than the reference value as a result of the comparison, the mobile terminal proceeds to step 607. Otherwise, the mobile terminal returns to step 603.

In step 607, the mobile terminal estimates motion vectors between consecutive images I$_n$(x,y) and I$_{n+1}$(x,y). The mobile terminal divides each consecutive image into a plurality of blocks having the same size. The mobile terminal estimates a motion vector between a first block of the image I$_n$(x,y) and a first block of the image I$_{n+1}$(x,y). The mobile terminal may estimate a motion vector of each block by repeating this operation until the mobile terminal estimates a motion vector between the last block of the image I$_n$(x,y) and the last block of the image I$_{n+1}$(x,y). The mobile terminal may estimate a motion vector of each block using Equation (1).

In step 609, the mobile terminal estimates motion blur kernels using the motion vectors, and then proceeds to step

611. The mobile terminal estimates a motion blur kernel of each block using the motion vector of each block.

For example, for a motion vector of (5, 0), because there is a motion only in the x-axis direction (i.e., horizontal direction), the mobile terminal may estimate a kernel of motion blur using a horizontal uniform blur matrix. If the center value is assumed to be arbitrary coordinates (x,y), a motion blur kernel H(x,y) of the motion vector (5, 0) is $$H(x, y) = \begin{bmatrix} 0 & 0 & 0 & 0 & 0 \\ 0 & 0 & 0 & 0 & 0 \\ \frac{1}{5} & \frac{1}{5} & \frac{1}{5} & \frac{1}{5} & \frac{1}{5} \\ 0 & 0 & 0 & 0 & 0 \\ 0 & 0 & 0 & 0 & 0 \end{bmatrix}$$

In step 611, the mobile terminal generates a motion blur-added image $I'_n(x,y)$ by adding motion blur to the image $I_n(x,y)$ using the motion blur kernels. The mobile terminal performs convolution on any one of a motion blur kernel of each block and each of pixels included in the block. The blur adder 305 generates the image $I'_n(x,y)$ by performing this operation for each block. The mobile terminal may generate the image $I'_n(x,y)$ using Equation (2).

In step 613, the mobile terminal generates the image $I'_{n+1}(x,y)$ by synthesizing the motion blur-added image $I'_n(x,y)$ and the image $I'_{n+1}(x,y)$ using a predetermined weight w(x,y). After displaying the image $I_n(x,y)$, the mobile terminal displays the generated image $I'_{n+1}(x,y)$ instead of the image $I_{n+1}(x,y)$, and returns to step 603.

For example, if the weight w(x,y) is 0.5, the image synthesizer 307 may synthesize the image $I'_n(x,y)$ and the image $I_{n+1}(x,y)$ at a ratio of one to one (1:1). Similarly, if the weight w(x,y) is 0.6, the image synthesizer 307 may synthesize the image $I'_n(x,y)$ and the image $I_{n+1}(x,y)$ at a ratio of six to four (6:4).

The image synthesizer 307 may generate the image $I'_{n+1}(x,y)$ using Equation (3).

Figure 7:
FIG. 7 illustrates an image having motion blur generated thereon according to an exemplary embodiment of the present invention.
Figure 7:
Figure 7:

FIG. 7 illustrates an image having motion blur generated thereon according to an exemplary embodiment of the present invention.

Referring to FIG. 7, a first image 701 represents an image $I_n(x,y)$ among consecutive images, and a second image 703 represents an image $I_{n+1}(x,y)$ among the consecutive images. A third image 705 represents a motion blur-generated image $I'_{n+1}(x,y)$.

The mobile terminal divides each of the first and second images 701 and 703 into a plurality of blocks, estimates a motion vector of each block between the first and second images 701 and 703, and estimates a motion blur kernel of each block using the motion vector of each block. The mobile terminal generates a fourth image by adding motion blur on the first image 701 using the motion blur kernel of each block, generates the third image 705 by synthesizing the fourth image and the second image using a weight, and then displays the generated image.

As is apparent from the foregoing description, the proposed apparatus and method according to exemplary embodiments of the present invention may prevent motion halting by generating motion blur on the image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for generating a motion blur in a mobile terminal, the apparatus comprising:
  a motion blur generator for, when motion halting occurs during video shooting, estimating a motion vector of each block between first and second consecutive images where the motion halting has occurred, for generating a motion blur on the second image based on the motion vector of each block, and for displaying the motion-blurred image on a display unit, wherein the motion blur generator comprises: a motion estimator for dividing each of the first and second images into a plurality of blocks, and for estimating a motion vector of each block between blocks of the first image and blocks of the second image; a blur kernel estimator for estimating a motion blur kernel of each block based on the motion vector of each block; a blur adder for generating a third image by adding a motion blur on the first image based on the motion blur kernel of each block; and an image synthesizer for generating a fourth image by synthesizing the third image and the second image, and for displaying the fourth image on the display unit.

2. The apparatus of claim 1, wherein the motion blur generator calculates a frame rate of video, and detects occurrence of the motion halting if the frame rate is less than a predetermined reference value.

3. The apparatus of claim 1, wherein after displaying the first image, the image synthesizer displays the fourth image instead of the second image.

4. The apparatus of claim 1, wherein the image synthesizer synthesizes the third image and the second image based on a weight representing a synthetic ratio of the third image to the second image.

5. A method for generating an image blur in a mobile terminal, the method comprising:
  determining whether motion halting occurs during video shooting;
  when the motion halting occurs, estimating a motion vector of each block between first and second consecutive images where the motion halting has occurred;
  generating a motion blur on the second image based on the motion vector of each block; and
  displaying the motion-blurred image on a display unit, wherein the estimating of the motion vector comprises: dividing each of the first and second images into a plurality of blocks, and estimating a motion vector of each block between blocks of the first image and blocks of the second image, and wherein the displaying of the motion-blurred image comprises: estimating a motion blur kernel of each block based on the motion vector of each block; generating a third image by adding a motion blur on the first image based on the motion blur kernel of each block; generating a fourth image by synthesizing the third image and the second image; and displaying the fourth image on the display unit.

6. The method of claim 5, wherein the determining of whether the motion halting occurs comprises:
  calculating a frame rate of video, and
  detecting occurrence of the motion halting if the frame rate is less than a predetermined reference value.

7. The method of claim 5, wherein the displaying of the motion-blurred image comprises displaying the fourth image instead of the second image, after displaying the first image.

8. The method of claim 5, wherein the displaying of the motion-blurred image comprises synthesizing the third image and the second image using a weight representing a synthetic ratio of the third image to the second image.

9. The method of claim 5, wherein the displaying of the motion-blurred image comprises displaying the motion-blurred image on a display unit of the mobile terminal.

10. A mobile terminal comprising:
a camera for shooting frames of video;
a motion blur generator for, when motion halting occurs while the camera is shooting the frames, estimating a motion vector for each block between first and second consecutive images where the motion halting has occurred, and for generating a motion blur on the second image based on the motion vector of each block; and
a display unit for displaying the motion-blurred image,
wherein the first and second images correspond to frames of video shot by the camera, wherein the motion blur generator comprises: a motion estimator for dividing each of the first and second images into a plurality of blocks, and for estimating a motion vector of each block between blocks of the first image and blocks of the second image; a blur kernel estimator for estimating a motion blur kernel of each block based on the motion vector of each block; a blur adder for generating a third image by adding a motion blur on the first image based on the motion blur kernel of each block; and an image synthesizer for generating a fourth image by synthesizing the third image and the second image, and for displaying the fourth image on the display unit.

11. The mobile terminal according to claim 10, wherein the motion estimator estimates the motion vector of each block according to $$\operatorname*{argmin}_{\Delta x_i \Delta y_j} \sum_{i \in Bx_i} \sum_{y \in By_j} |I_n(x, y) - I_{n+1}(x + \Delta x_i, y + \Delta y_j)|,$$

wherein Bxi represents an x-axis range of the block, Byj represents a y-axis range of the block, In represents an n-th image, In +1 represents an (n+1)-th image, x represents the horizontal coordinate in the first image, and y represents the vertical coordinate in the first image.

12. The mobile terminal according to claim 10, wherein the blur adder generates the third image according to $$I'_n(x,y) = I_n(x,y) ** H(x,y),$$

wherein I'n represents an n-th image to which image blur is added, In represents an n-th image, H represents a motion blur kernel, x represents the horizontal coordinate in the first image, and y represents the vertical coordinate in the first image.

13. The mobile terminal according to claim 10, wherein the image synthesizer generates the fourth image according to $$I'_{n+1}(x,y) = I'_n(x,y) \times w(x,y) + I_{n+1}(x,y) \times (1-w(x,y)),$$

$I'_{n+1}$ represents a motion blur-synthesized image, $I'_n$ represents an n-th image to which image blur is added, $I_{n+1}(x,y)$ represents an (n+1)-th image, w(x,y) is a weight representing a synthetic ratio of $I'_n(x,y)$ to $I_{n+1}(x,y)$, x represents the horizontal coordinate in the fourth image, and y represents the vertical coordinate in the fourth image, and wherein w(x,y) has a range of 0≤w(x,y)≤1.

* * * * *